United States Patent
Cid-Aguilar et al.

(10) Patent No.: US 8,318,054 B2
(45) Date of Patent: Nov. 27, 2012

(54) DARK GREEN SOLAR CONTROL GLASS COMPOSITION

(75) Inventors: José Guadalupe Cid-Aguilar, Nuevo León (MX); Roberto Marcos Cabrera-Llanos, Nuevo León (MX); Miguel Angel Kiyama-Rodriguez, Nuevo León (MX)

(73) Assignee: Vidrio Plano de Mexico, S.A. de C.V., Nuevo Leon (MX)

( * ) Notice: Subject to any disclaimer, the term of this patent is extended or adjusted under 35 U.S.C. 154(b) by 0 days.

(21) Appl. No.: 12/791,949

(22) Filed: Jun. 2, 2010

(65) Prior Publication Data

US 2011/0297900 A1 Dec. 8, 2011

(51) Int. Cl.
*F21V 9/04* (2006.01)
*F21V 9/06* (2006.01)
*G02B 5/22* (2006.01)
*G02B 5/26* (2006.01)
*C03C 3/078* (2006.01)

(52) U.S. Cl. .......... 252/588; 428/230; 428/426; 501/72; 501/905

(58) Field of Classification Search ............ 501/41, 501/71, 905, 70, 904, 72; 428/220, 426; 252/588
See application file for complete search history.

(56) References Cited

U.S. PATENT DOCUMENTS

| | | | | |
|---|---|---|---|---|
| 5,214,008 A | * | 5/1993 | Beckwith et al. | 501/69 |
| 5,308,805 A | * | 5/1994 | Baker et al. | 501/71 |
| 6,030,911 A | * | 2/2000 | Scheffler-Hudlet et al. | 501/71 |
| 2007/0191208 A1 | * | 8/2007 | Teyssedre et al. | 501/71 |

* cited by examiner

*Primary Examiner* — Bijan Ahvazi

(74) *Attorney, Agent, or Firm* — Abelman, Frayne & Schwab

(57) ABSTRACT

The present invention provides a dark green colored glass composition having a soda-lime-silica glass composition, wherein the coloring compounds comprises in weight percentage: from 0.71 to 1.50% of total iron expressed as $Fe_2O_3$; from 22 to 30% of ferrous-ferric ratio and from 0.15 to 0.50% of expressed as FeO; from 0.10 to 0.20% of $SO_3$ without affecting the refining properties and ability of the $SO_3$ to eliminate bubbles; about 0 to 1.0 wt. % $TiO_2$; about 0.0004 to 0.03 wt. % $Cr_2O_3$; and also 0.0004 to 0.015 wt. % CuO.

7 Claims, No Drawings

DARK GREEN SOLAR CONTROL GLASS COMPOSITION

BACKGROUND OF THE INVENTION

A. Field of the Invention

The present invention refers to a glass composition and a method for the commercial production of a dark green glass mainly for use in the automotive industry such as windshields, sidelights and rear windows, which includes a basic composition of soda-lime-silica glass, and consists essentially, in weight percentage: from 0.71 to 1.50% of total iron expressed as $Fe_2O_3$; from 22 to 30% of $Fe^{2+}$ and from 0.15 to 0.50% of FeO, expressed as $Fe_2O_3$; from about 0.10 to about 0.20% of $SO_3$; from about 0 to about of 1.0 wt. % $TiO_2$; from about 0.0004 to about of 0.03 wt. % $Cr_2O_3$; and from about 0.0004 to about 0.015 wt. % CuO.

The dark green glass having an illuminant "A" light transmission (TLA) greater of 65%, a total solar energy transmittance (TS) of less than or equal to 60%, and a solar ultraviolet transmittance (TUV) of less than 46%; a dominant wavelength from 490 nm to 600; and excitation purity of less than 7, for thickness of 3.5 mm.

B. Description of the Related Art

Several patents have been developed for obtaining green glass, for "automotive" purposes, having a light transmission greater to 70, which meets with the requirements of the U.S. Federal Motor Vehicle Safety Standard. For the construction industry there is not restriction and smaller values can be obtained as well as thicknesses between 1.6 and 12 mm.

The glasses disclosed in almost all the prior patents referring to a type of green glass for automotive purposes, are based on three basic components: iron oxide titanium oxide and chromium oxide as well. Similarly, it is highly desirable that the glass have the necessary absorption properties to absorb damaging infrared (IR) and ultraviolet (UV) solar light, so as to reduce the excessive heating within the vehicles on sunny days, and to protect the interior of the vehicle from the degradation caused by ultraviolet radiation.

Also, it is well-known that the transmitting characteristics of the glass of different wavelengths can be controlled by adding several absorbent coloring agents in the initial glass batch. Consequently, for vehicle applications, it has been desirable to use colorants to produce a glass that is able to filter a large portion of the damaging ultraviolet rays from the sun, lower than 39% (measured in the wavelength of λ 300-400 nm and air mass 2 or less than 35% in the same wavelength range with air mass equals 1.5), but that permits the largest possible visible amount (of the luminous rays) up to 70% or more. Together with the typical formulation of a soda-lime-silica glass, constitutes the basic composition of the glass.

That is the case of the glasses of the U.S. Pat. No. 6,030,911 of Scheffler-Hudlet, et al, issued on Feb. 29, 2000, which has glass redox value from 0.202 to 0.237% of FeO; another U.S. Pat. No. 6,350,712 of Cabrera, issued on Feb. 26, 2002 in which iron oxide, titanium oxide and chromium oxide are used as main components. The titanium oxide compound is present in an amount of 0.0 to 0.30 wt. % and about 0.01 to 0.03 wt % of chromium oxide.

Several patents have been developed for obtaining colored glass, using a standard soda-lime glass base composition. For automotive use it is highly desirable that the glass have a high level or percentage of visible light transmission, in order to provide the driver a good visibility of his surroundings, thus, complying with the norms of automotive safety. As well, it is highly desirable that the glass have the necessary absorption properties to retain or absorb damaging infra-red (IR) and ultra-violet (UV) solar light, so as to control the accumulation of heat in the interior of vehicles, which will result in a reduction in power consumption needed for the automotive air conditioning equipment and for the vehicles themselves.

Also, it is well-known that the transmitting characteristics of the glass of different wavelengths can be controlled by adding several coloring agents in the initial batch glass composition. Consequently, for automotive applications, it has been desirable to use colorants to produce a glass that is able to filter a large portion of the damaging ultra-violet rays from the sun, lower than 39% (measured in the wavelength of 300-400 nm), but with the highest possible visible amount (of the luminous rays) up to 70% or more.

The iron is generally present in the glass as a ferric oxide, imparting to the glass a clear green color. The spite of that, within the glass composition, the total amount of iron present is found to comprise both ferric oxide $Fe_2O_3$ and as ferrous oxide FeO since, even when pure ferric oxide is used in the basic raw materials during the glass melting process, a portion of the ferric oxide is reduced and is transformed into Ferrous oxide.

Normally, the total quantity of iron in the glass and its amount of ferrous oxides are expressed as being based on $Fe_2O_3$. It is also standard in this industry to express the quantity of ferrous or ferric oxide as a percentage of the total iron, namely:

$$\% \, Fe^{+2}(FERROUS) = \frac{FeO \times 100}{Total \, Fe_2O_3}$$

$$\% \, Fe^{+3}(FERRIC) = \frac{Fe_2O_3 \times 100}{Total \, Fe_2O_3}$$

The iron oxides (ferric and ferrous) impart different optical properties to the glass, the total quantity of iron present and its equilibrium as ferric or ferrous have a direct impact on the color, light transmission and absorption of infrared and ultraviolet radiation. The ferric oxide absorbs ultra-violet energy (low transmission level), and at the same time it has a high level of light transmission, and of infrared energy transmission and it possesses a tenuous yellow-yellow greenish color.

By contrast, ferrous oxide absorbers infrared energy (low transmission level), has a high level of ultraviolet transmission, and a lower level of light transmission and possesses a more intense blue color.

Therefore, the greater the quantity of $Fe_2O_3$ present in the glass, the greater will be the absorption of ultraviolet radiation, and the light transmission is increased but, as the contents of FeO is increased as a result of the chemical reduction of $Fe_2O_3$, the absorption of the infrared radiation will increase, but the absorption of the ultraviolet radiation is decreased and the light transmission is also (undesirable) decreased.

On the other hand, the greater the concentration of FeO in relation to $Fe_2O_3$, results in a change in the color of the glass. The shift toward a higher concentration of FeO in relation to the $Fe_2O_3$ causes a change of color of the glass from a yellow or yellow-green to a darker blue-green sometimes undesirable, because it reduces the light transmission of the glass.

Therefore, in order to manufacture a glass with determined properties and color, one must have the correct proportion of $Fe_2O_3$ and FeO, taking into account that what is increased on the ferrous side, will diminish on the ferric one, and consequently one must arrive at a compromise of properties since improving (lowering) the value of one property will worsen (rise) the value of the other properties.

In order to increase the absorption of the infra-red-and ultra-violet radiation without sacrificing the transmission of the visible spectrum, it is necessary to lower the total content of the iron which is highly reduced from ferric to ferrous, to less than 0.70% of total iron expressed as $Fe_2O_3$.

Depending on the state of reduction of the glass, the coloring changes as follows:

low ferrous (12%)-yellow-high light transmission (high ferric) yellow-green
 green-yellow
 green (desirable)
 green-blue
 blue-green
 blue
 high ferrous (75%)—amber—low light transmission (low ferric)

Additionally, it is known that the oxides of titanium, molybdenum and the cerium, principally of cerium, also are colorants, and when they are used in combination with the $Fe_2O_3$, it is possible to obtain an additional reduction of the ultraviolet light transmission to a point where the sought for visibility transmission is achieved. It does, however, suffer from the disadvantage of its high cost, which makes the formulation very expensive, and has a tendency to oxidize the iron to $Fe_2O_3$.

In addition, while the use of $CeO_2$ in quantities from 0.1 to 0.5% provides absorption of ultra-violet radiation, it has the disadvantage that it tends to change the most desirable green color, to an unacceptable yellowish hue.

In order to control the reduction of the glass formulation, metallic tin, stannic chlorides, and mainly coal, have been employed as reducing agents, introduced them in the charge. Coal is used in a finely divided state in an amount of 0.01 to 0.06%, preferably 0.025% of the total amount of the batch.

In order to maintain a constant ferrous value and conserve the green color of the glass, the amount of coal required to counter the oxidizing effect provoked by the introduction of 1% cerium oxide in a typical glass with a low content of iron, is within the range of 0.9 kilograms per ton of glass. Pursuant to the opinion of some researchers in the field, this level of coal interferes with the humidification action of the silica of the saline cake and, therefore, it results in the formation of silica slag in the melting furnace.

Similarly, in order to maintain the ferrous value constant, thus counteracting the oxidizing effect, of a constant amount of cerium oxide is added as the content of iron in the glass increases. For example, up to 0.80% of total iron added, it was foreseen that the same amount of coal should be added due to the fact that the level of cerium oxide is constant, or that the requirement of coal should be much greater due to the fact that the equilibrium of the ferrous value would lessen with the greater addition of iron.

Many papers have been published on colored glass compositions with infrared and ultraviolet radiation absorbing characteristics. W. A. Weyl in the book Coloured Glasses, Society of Glass Technology, reprinted 1992, describes diverse theories of colour in glasses related to the current views of the structure and constitution of glass. The use of chromium and its compounds for coloring glasses is described in said book. In the glass industry the chromium is added to the raw materials to obtain a color emerald green which is typical of $Cr^{3+}$ The chromium can be present as $Cr^{6+}$ as $Cr_4O_2$ to obtain a lightly yellow color and as $Cr^{2+}$ through which the emerald green is obtained.

C. R. Bamford, in the book Colour Generation and Control in Glass, Glass Science and Technology, Elsevier Science Publishing Co., Amsterdam, 1977; describes the principles, the methods, and the applications about the coloration of glass. In this book the author considers that three elements govern the color of the light transmitted by a glass, namely: the color of the incident light; the interaction of the glass with that light; and the interaction of the transmitted light with the eye of the observer. The procedures require the spectral transmission data of the glass at the relevant glass thickness and the relevant angle of viewing.

K. M. Fyles in the paper Modern Automotive Glasses, Glass Technology, vol 37, February, 1996, pp 2-6, considers that the iron is the most important colorant in modern automotive glasses since it is the only cheaply available component which absorbs harmful ultraviolet radiation (ferric iron) and also absorbs a large proportion of the infrared (ferrous iron).

Werner Vogel in the book Chemistry of Glass; The American Ceramic Society, Inc. 1985, consider that in general the colorless glass present an absorption in the UV region for base glasses. For example the glasses with a longer transmission in the UV are the phosphate glasses, silica glasses, boron glasses, germanium glasses, etc.

Gordon F. Brewster, et al, in the paper "The color of iron-containing glasses of varying composition", Journal of the Society of Glass Technology, New York, USA, April, 1950, pp 332-406, is related to the colours changes caused by systematic composition variations in iron-containing silicate and silica-free glasses evaluated in terms of visual colour, spectral transmission and chromaticity.

Other papers also describe the importance of the equilibrium between ferrous and ferric oxides in glasses such as the one written by N. E. Densem; The equilibrium between ferrous and ferric oxides in glasses; Journal of the Society of Glass Technology, Glasgow, England, May 1937, pp. 374-389"; "J. C. Hostetter and H. S. Roberts, "Note on the dissociation of Ferric Oxide dissolved in glass and its relation to the color of iron-bearing glasses"; Journal of the American Ceramic Society, USA, September, 1921, pp. 927-938.

Finally, the paper "Effects of Titanium Dioxide in Glass" by M. D. Beals, The Glass Industry, September, 1963, pp 495-531, describes the interest that has been shown the titanium dioxide as a constituent of glasses. The effects produced by the use of titanium dioxide included the comments that $TiO_2$ greatly increases the refractive index, increases the absorption of light in the ultraviolet region, and that is lowers the viscosity and surface tension. From the data on the use of titanium dioxide in enamels, they noted that $TiO_2$ increases the chemical durability and acts as a flux. In general, clear glasses containing titanium dioxide may be found in all of the common glass-forming systems (borates, silicates, and phosphates). The various regions of glass formation for systems containing titanium dioxide are not grouped in any one place, since the organization of the discussion is based more on the properties and uses of glasses containing titanium dioxide than on their constitution alone.

On other hand, some others glasses disclosed in other patents that have been developed for obtaining colored glass, using a standard soda-lime glass base composition, such as those mentioned in the following paragraphs use, different metallic elements as titanium, chromium conferring the characteristics to the final product, that allow them a TLA>70%, in order to be used in the automotive industries.

The U.S. Pat. No. 4,792,536 by Pecoraro, et al, claims a transparent infrared absorbing glass having at least 0.45 percent by weight iron expressed as $Fe_2O_3$, forming a glass into a flat glass product. The oxidation-reduction conditions are controlled in a stage of the production process and in subsequent stages so as to yield a glass having at least 35% of the iron in the ferrous state expressed as FeO and which when formed into a flat glass product of suitable thickness exhibits the combination of luminous transmittance of at least 65% and U.S. Pat. No. 5,077,133 by Cheng, claims a glass having a final infrared transmittance of no more than 15%. composition that includes 0.51% to 0.96% of $Fe_2O_3$, 0.15% to 0.33% of FeO and 0.2% to 1.4% of $CeO_2$, wherein the percentage by weight of FeO, represents a percentage reduction of the total iron, expressed as $Fe_2O_3$, from 23% to 29%, so that the glass has an illuminating wavelength of C, from 498 to 525 nanometers (nm) and a hue purity of 2% to 4%

In order to obtain the latter, U.S. Pat. No. 5,112,778 also Cheng, indicates that the redox reaction is balanced between the ferric and ferrous oxides, the cerium oxide and the coal in a soda-lime-silica glass, changes to a state of a greater reduction when the content of total iron is increased up to a 0.05% to a 0.8%, The reason for which the ferrous value increases instead of decrease, a situation that was expected. Consequently, in order to change the reduction state so as to obtain the same ferrous value found in the lesser concentration of the total iron, the quantity of coal added to the smelting furnace, which has a total content of iron, must be diminished, a statement which is contrary to the teaching of the prior art, i.e. it will require less coal for a high content of total iron in the formulation of the soda-lime-silica glass.

The main disadvantage of the glasses described in the Cheng patents is as already been mentioned, they necessarily include the $CeO_2$ as an agent to control the reduction for the formulation, mainly the $Fe_2O_3$. Another disadvantage of the use of cerium oxide as a required component is the high cost as a raw material.

Finally, another known ingredient present in the soda-lime-silica glass is sulfuric trioxide ($SO_3$). Sodium sulfate ($Na_2SO_4$) is added to the raw materials batch of the glass as a refining agent at a high temperature, which is used principally as an agent for bubble elimination, and promotes mass transport, attacks free silica at the surface of the glass and lessens the number of solid inclusions.

On the other hand, the sodium sulfate has oxidizing properties, which is the reason why normally small amounts of carbon are added to the mixture, in order to prevent oxidation and at the same time lower the temperature of reaction.

During the manufacture of the glass, the $Na_2SO_4$, which is the main contributor of sulfur in the glass, converts into $SO_3$, which controls the conversion of the $Fe_2O_3$ into FeO. However, the $SO_3$ present in the final glass does not affect the ability of the glass to transmit visible light.

The amount of $SO_3$ dissolved in the glass decreases if it has:
1. A lesser quantity (proportion-wise) of the sodium sulfate.
2. Greater melting properties
3. Greater melting times.
4. A furnace environment that has greater oxidation action.
5. Greater reduction of the iron to ferrous oxide (greater $Fe^{2+}$; lesser $Fe^{3+}$) arriving at a minimum of 70-75% of the $Fe^{2+}$.

Therefore, the quantity and effects of the $SO_3$ in the glass batch has to be balanced in accordance with the amount of carbon present in the glass batch.

Furthermore, it is a common knowledge that $SO_3$ in the glass batch must to be within certain critical quantities because lesser amounts of $SO_3$ in the glass batch will affect the refining properties, i.e. the ability to eliminate bubbles in the melting furnace.

It is upon these bases that the U.S. Pat. No. 5,214,008 by Beckwith and U.S. Pat. No. 5,240,886 by Gulotta who claim, respectively, a green glass having the property of ultra-violet radiation absorbance, which contains 0.7% to 0.95% of total iron, approximately 0.19% to 0.24% of FeO and approximately 0.20 to 0.25% of $SO_3$ (in the absence of $CeO_2$), and a green glass of ultra-violet radiation absorbance with a total iron content greater than 0.85%, a content of $CeO_2$ less than 0.5%, and a relation to the FeO/total iron of less than 0.275%. The Gulotta's patent describe that the glass reduces the amount of costly cerium oxide required to yield low ultraviolet transmittance, viz, no greater than 31% (300 to 390 nanometers) at a reference thickness of 3.9 millimeters.

In both the Beckwith and Gulota patents, the FeO present in relation to the total FeO/$Fe_2O_3$, is found to be ferrous and is not transformed to the ferric type, as is done by the inventors of the present invention. As well the Gulotta's patent describe that the glass reduces the amount of costly cerium required to yield low ultraviolet transmittance, viz., no greater than 31 percent (300 to 390 nanometers) at a reference thickness of 3.9 millimeters.

Other example of a colored glass composition is disclosed in U.S. Pat. No. 5,308,805 by Baker, et al, which describes a neutral, generally green-gray low transmittance (no more than 25 luminous transmittance) soda-lime-silica glass, which has a reduced solar energy transmittance, which contains 1.3% to 2% of $Fe_2O_3$ (total iron) 0.01% to 0.05% of NiO; 0.02% to 0.04% of CoO; and 0.0002% to 0.003% of Se. 1.3% to 2% of $Fe_2O_3$. The glass has a ferrous value in the range of 18 to 30.

In the U.S. Pat. No. 5,776,845 by Boulos, et al, it is described a green soda-lime-silica glass composition having excellent ultraviolet absorbing ability while having a relatively high light transmittance. The colorants of the glass composition consist essentially of: greater than 0.5% to 1.5% of total iron oxide as $Fe_2O_3$; wherein the weight ratio of $Fe^{2+}/Fe^{3+}$ is less than 0.35%; 0.10 wt. % to 2.00 wt. % manganese compound as $MnO_2$; and optionally any of: up to 1.00 wt. % titanium oxide as $TiO_2$, up to 1.00 wt. % cerium oxide as $CeO_2$; up to 1.00 wt. % vanadium oxide as $V_2O_5$; and up to 0.20 wt. % chromium oxide as $Cr_2O_3$; the glass composition having, at 4.0 mm thickness; 55 to 80% light transmittance using Illuminant A with less than 46% ultraviolet transmittance measured over the range of 300 to 400 nanometers.

The U.S. Pat. No. 5,830,812 by Shelestak, et al, describes a green colored glass using a standard soda-lime-silica glass base composition and additionally iron, cerium, chromium and, optionally, titanium as infrared and ultraviolet radiation absorbing materials and colorants. Preferably, the glass has a green color characterized by a dominant wavelength in the range of about 500 to 565 nanometers with an excitation purity of no higher than about 5% and includes about 0.50 to 1.0 wt. % total iron, about 0.26 to 0.65 wt. % $Fe_2O_3$, about 0.05 to 3 wt % $CeO_2$; 0 to about 2 wt. % $TiO_2$, and about 20 to 650 PPM $Cr_2O_3$. The redox ratio for the glass is maintained between about 0.20 to 0.55 and preferably between 0.20 and 0.30. The glass compositions disclosed in the present invention have an LTA of at least about 65%, preferably at least 70%, a TSUV of no greater than 38%, preferably no greater than 35%, a TSIR of no greater than about 35%, preferably no greater than about 30%, and a TSET of no greater than about 60%, preferably, no greater than about 45%.

The Shelestak's patent uses the oxides of titanium and mainly cerium, as colorants, and when they are used in combination with the $Fe_2O_3$, it is possible to obtain an additional reduction of the ultraviolet light transmission to a point where the sought for visibility transmission is achieved. It does, however, suffer from the disadvantage of its high cost, which makes the formulation very expensive, and has a tendency to oxidize the iron to $Fe_2O_3$.

In addition, while the use of $CeO_2$ in quantities from 0.05 to 3.0%, provides absorption of ultraviolet radiation, it has the disadvantage that it tends to change the most desirable green color, to an unacceptable yellowish hue.

In order to convert the FeO to ferrous oxide, expressed as ferric, it is necessary to multiply the same by the factor of 1.111358.

Furthermore, as it can be clearly appreciated from the above patents, in order to express the visible light transmission characteristics of a glass, it is necessary to take into account the following three main items:

1. The thickness at which it is measured, since the transmission of UV, visible light and infrared decline in direct relation with the increase of the thickness of the glass.

2. The wavelengths of the different zones, for example the UV transmission is considered to be from 300 to 400 nm (ISO 13837 convention A); from 300 to 390 nm according to PPG's U.S. Pat. No. 5,240,866; from 282.5 to 377.5 nm in ISO 9050 (1990); as well as if the increments were from 2.5, 5 or 10 nm. Consequently, there will be different values when measuring the ultraviolet transmission for the same product.

3. The standard used in respect to the solar energy, should be established beforehand, for example: "CIE PUBL:" 40; and the air mass, Perry & Moon Air Mass=1, Air Mass=2, or Air Mass=1.5 as used in the recent ISO 13837 standard. It should be mentioned that the addition of $Na_2SO_4$ as a source of $SO_3$ in the glass, is already well known, and that some U.S. patents such as U.S. Pat. Nos. 2,755,212 and 4,792,536 already mentioned the content of $SO_3$ in quantities of 0.29% and 0.02%, respectively, the range of $SO_3$ as been between 0.20% and 0.25% in the glass of the U.S. Pat. No. 5,214,008 is considered critical and is a limitation on the scope of that patent.

Additionally, the U.S. Pat. No. 7,094,716 by Boulos added additionally to both cerium and titanium oxides, the component of $MnO_2$ in order to provide a more advantageous ultraviolet absorbance and a way to adjust color to the glass.

On the other hand, it is well known by the persons skilled in the art, that the addition or substitution of one or more colorants for other colorants, or the change in the relative proportional amount in the glass composition, affects not only the color of the product, as for example the dominant wave length of the color or the excitation purity, but also the luminous transmission, the heat absorption and additional properties such as the transmission of ultraviolet and infrared radiation.

It has been known that copper played an important role in the production of colored glass, ceramics and pigments. It has been recognized, for example, the coloration of the Persian ceramic for their tonality conferred by the copper. Of special interest for ceramic artists are the turquoise blue and especially the Egyptian and Persian blue dark (Woldemar A. Weil; Colored Glasses, Society of Glass Technology, Great Britain, p. 154-167, 1976).

Copper has been used in the glass compositions, not only in those of soda-lime-silica type, but also in others such as those containing, for example, borosilicate. Therefore, the developed color depends on several factors, as the ones mentioned: the oxide base of the glass, concentration of colorants and also to its oxidation state.

For the case of the above mentioned glass as a base, the copper in the form of the oxide imparts a blue coloration of a greenish tone, specifically turquoise, however in the glass; the copper can be in its monovalent state, which does not impart color. So, the blue greenish coloration depends not only on the amount of copper present, but on the ionic balance between the cuprous and cupric states. The maximum absorption of the copper oxide is in a band centered at 780 nm and a maximum weak secondary peak is present at the 450 nm, which disappears at high soda content (around 40% weight). (C. R. Bamford, Colour Generation and Control in Glass, Glass Science and Technology, Elsevier Scientific Publishing Company, p. 48-50, Amsterdam, 1977).

SUMMARY OF THE INVENTION

According to the present invention, there is provided a soda-lime-silica glass composition that utilizes ferric and ferrous oxide, titanium oxide, chromium oxide and copper oxide to produce a glass suitable for use in automotive industry with a thickness of form about 1.6 to 12 mm and preferably form 1.6 to about 5.0 mm Contrarily to the expected by the persons having knowledge in the field, the inventors of the present invention found, surprisingly, that for a content of 0.71% to 1.50% of total iron expressed as $Fe_2O_3$; 22% to 30% of $Fe^{2+}$; 0.15% to 0.50% of FeO, expressed as $Fe_2O_3$; a critical content of 0.10% to 0.20% of $SO_3$, which is lesser that the commonly expected in the field and which does not affects the refining properties and ability of the $SO_3$ to eliminate bubbles.

It has been verified that for industrial production is feasible to add CuO, in minor concentrations to 120 ppm for a glass thickness of 4.0 mm and less than 100 ppm for a glass thickness of 6.0 mm.

The glass also can be manufactured with a thickness from about 3.5 millimeters to about 4 mm. If higher concentrations of CuO are presented within of the float chamber, a reduction process in the atmosphere could be given, presenting a red coloration on the glass surface. This effect related with the residence time and to the advancing velocity of the glass ribbon can be intense and observable on the glass surface.

It is therefore the main objective of the present invention to provide a dark green solar control glass composition which can be manufactured a thickness of about 3.5 millimeters to about 4 millimeters, with a light transmission using "A" of at least 70%; a reduced ultraviolet radiation transmittance (TUV) of no greater than 46%, and more preferably no greater than 35% using air mass equals 1.5 from 300 to 400 nm ISO 13837 convention A standard; a direct solar heat transmittance (TS) of no greater than about 60%, preferably, no greater than about 45% ISO 13837; a dominant wavelength from about 490 to 600 nm; a purity of less than 7%; and, a color tint as defined by the CIELAB, in the ranges a* from −14.49 to −5.07, preferably between −11 to −7, b* from +8.88 to 0, preferably between 0 to 3.5, and having an L* value greater than 82.

Similarly another a main object of the present invention is the providing of a dark green solar control glass composition of the previously mentioned nature, that has a content of 0.71 to 1.50% of total iron expressed as $Fe_2O_3$; from 22 to 30% of $Fe^{2+}$ and 0.15 to 0.50% of FeO, expressed as $Fe_2O_3$; a critical amount of 0.10 to 0.20% of $SO_3$ without affecting the refining properties and ability of the $SO_3$ to eliminate bubbles; from about 0 to 1.0 wt. % $TiO_2$; from about 0.0004 to 0.03 wt. %

$Cr_2O_3$; and also from 0.0004 to 0.015 wt. % CuO and optionally contain cerium oxide less than 0.8%. The dark green glass having an illuminant "A" light transmission (TLA) greater of 70%, a total solar energy transmittance (TS) of less than or equal to 60%, and a solar ultraviolet transmittance (TUV) of less than 46%; a dominant wavelength from 490 nm to 600; and excitation purity of less than 7.

In addition, still another main objective of the present invention to provide a dark green solar control glass composition that reduces the thickness of a glass sheet maintaining its desirable properties of transmission of visible light and of the absorption of infrared and ultraviolet radiation.

Another objective of the present invention to provide a dark green solar control glass composition whose production is more economical due to the absence of cerium oxide optional and to its critical low content of $SO_3$, maintaining its desirable properties of transmission of visible light and of the absorption of infrared and ultraviolet radiation.

These and other objects and advantages of the dark green solar control glass composition of the present invention will become evident to persons who have knowledge in the field, from the following detailed description of the invention, in relation to a specific embodiment.

DETAILED DESCRIPTION OF THE INVENTION

The invention will now be described in relation to a specific embodiment, wherein the amounts of the main components which are critical for obtaining a dark green solar control glass composition with the desired properties of visibility transmission and the absorption of infrared and ultraviolet radiation are set forth.

The typical composition of a soda-lime-silica glass used in the automotive industry, and formed by the so-called glass float process, is characterized by the following formulation based on weight percentage with regard to the total weight of the glass:

| Components | % by weight |
|---|---|
| $SiO_2$ | 70 to 75 |
| $Al_2O_3$ | 0 to 2 |
| CaO | 5 to 12 |
| MgO | 3 to 4.2 |
| $Na_2O$ | 12 to 15 |
| $K_2O$ | 0 to 2 |
| $SO_3$ | 0.1 to 0.2 |

The solar control glass composition of the present invention is based on the above disclosed composition, to which the following coloring compounds have been added: Components by weight of 0.71 to 1.50% of total iron expressed as $Fe_2O_3$; 22 to 30% of $Fe^{2+}$ and 0.15 to 50% of FeO expressed as $Fe_2O_3$; a critical amount of 0.10 to 0.20% of $SO_3$ without affecting the refining properties and ability of the SO3 to eliminate bubbles; about 0 to 1.0 wt. % $TiO_2$; about 0.0004 to 0.03 wt. % $Cr_2O_3$; and also 0.0004 to 0.015 wt. % CuO and optionally contain cerium oxide less than 0.8% for improving UV absorbance in spite of the additional cost that it could represent to the glass composition.

When the coloring compounds were added to the basic composition, a glass sheet with a thickness of about 3.5 millimeters to about 4 millimeters was manufactured, resulting with a light transmission (TLA) using "A" of at least 70%; a reduced ultraviolet radiation transmittance of less than 46% using air mass equals 1.5 from 300 to 400 nm ISO 13837 convention A standard; a direct solar heat transmittance of less than 60%; a dominant wavelength from about 490 to 600 nm; a purity of less than 7%; and a color tint as defined in the CIELAB, in the ranges a* (green-red) from −14.49 to −5.07, preferably from −11 to −7, b* (blue-yellow) from +8.88 to 0, preferably from 0 to 3.5, and having an L* value greater than 82.

It is common in the glass industry to refer the total iron content in the glass composition or in the glass melting mixture, as the total iron expressed as $Fe_2O_3$.

When a lot of glass is melted, part of that amount of total iron is reduced to FeO, while the rest is maintained as $Fe_2O_3$. The balance between the ferric and ferrous oxidation states in the melted mixture are the result of an equilibrium of the final oxidation reduction state, which is a mixture between the use of oxidation or reducing agents in the feed mixture and to the combustion characteristics, for example, the air-gas relationship used in the furnace in order to melt the batch. The reduction of produces not only FeO, but also oxygen, decreasing the combined weight of the two compounds of iron in the resulting glass.

Consequently, the combined weight of the FeO and $Fe_2O_3$ contained in the resulting glass composition will be minor, less than that fed during the melting, and less than the total of the initial iron used expressed as $Fe_2O_3$. For this reason, it is understood that the total iron is the iron expressed as $Fe_2O_3$, as it is used herein, as meaning the amount of iron fed in the mixture before its reduction. And it is to be understood that the reduction value of the ferrous state is defined as the weight of the ferrous oxide (FeO) expressed as $Fe_2O_3$ in the glass product, divided by the weight percentage of total iron expressed in the form of reduction percentage.

The physical properties such as light transmission correspond to calculated variables based on internationally accepted standards. So that, the light transmission is evaluated using the illuminant "A" and standard Observer of 2 degree also known as of 1931 [C.I.E. Publication, 15.2, ASTM E-308 (1990)]. The wavelength range used for these purposes is of 380 to 780 nm, integrating values in numeric form with intervals of 10 nm. The solar energy transmission represents the heat which the glass achieves in direct form, evaluating it from 300 nm to 2500 nm with intervals of 50 nm, the numeric form of calculation uses as recognized standard values those reported by Parry Moon in "Proposed Standard Solar Radiation Curves for Engineer Use", Franklin Institute, vol. 230, p. 604, table II, 1940.

The calculation of the ultraviolet radiation transmission (UV), involves only the participation of the solar UV radiation, so that it is evaluated in the range of 300 to 400 .nm of wavelength using intervals of 10 nm and air mass equals 1.5 ISO 13837 convention A standard.

The amount of solar heat which is transmitted through the glass also can be calculated by the contribution of thermal energy with which participates each one of the regions wherein the solar spectrum has influence, which is from the ultraviolet region 300 nm, to near infrared region 2500 nm, which is of 3% for UV, 44% for the visible and of 53% in order for the IR, however, the values of the direct solar energy transmission, in the present invention, are calculated on the basis of a numeric integration taking into account the whole range of the solar spectrum of 300 to 2500 nm, with intervals of 50 nm and using the values of solar radiation reported ISO 13837 standard.

The specifications for the determination of color such as the dominant wave length and the purity of excitement have been derived from the tristimulus values (X, Y, Z), which have been adopted by the International Commission of Illumination (C.I.E.), as direct result of experiments involving many observers. These specifications could be determined by the calculation of the three-chromatic coefficients X, Y, Z of the tristimulus values that corresponding to the red, green and the blue colors, respectively. The three-chromatic values were graphicated in the chromaticity diagram and compared with the coordinates of the illuminant "D65" considered as illumination standard. The comparison provides the information in order to determine the color purity excitement and its dominant wavelength. The dominant wavelength defines the wavelength of the color and its value is located in the visible range, of the 380 to 780 nm, while for the purity of excitement, the less the value is, the nearest tends to be a neutral color. A deeper understanding of the topics can be obtained from the "Handbook of Colorimetry" published by the "Massachussets Institute of Technology", of Arthur C. Hardy, issued in 1936.

The color variables L*, a* y b* of the color system CIELAB 1976, are also calculated through the tristimulus values.

The following are specific examples of soda-lime-silica composition in accordance with the present invention, having corresponding physical properties of visible, ultraviolet and infrared radiation transmittances, for a glass having a thickness of 4 mm.

TABLE 1

|  | 1 | 2 | 3 | 4 | 5 | 6 | 7 | 8 | 9 | 10 |
|---|---|---|---|---|---|---|---|---|---|---|
| % Fe2O3 | 0.50 | 0.51 | 0.52 | 0.52 | 0.52 | 0.52 | 0.53 | 0.53 | 0.53 | 0.53 |
| % SO3 | 0.127 | 0.14 | 0.142 | 0.15 | 0.141 | 0.143 | 0.146 | 0.149 | 0.143 | 0.151 |
| % Ferrous | 27.3 | 27.3 | 27.0 | 25.2 | 25.6 | 26.8 | 26.4 | 26.1 | 26.3 | 26.0 |
| Thickness (mm) | 4 | 4 | 4 | 4 | 4 | 4 | 4 | 4 | 4 | 4 |
| % Tuv | 47.9 | 47.3 | 45.8 | 47.2 | 46.9 | 47.5 | 46.0 | 47.0 | 46.9 | 46.5 |
| % $T_{LA}$ | 80.0 | 79.6 | 78.9 | 79.8 | 79.6 | 79.9 | 79.5 | 79.5 | 79.6 | 79.6 |
| % Ts | 57.1 | 56.6 | 56.0 | 57.7 | 57.3 | 56.6 | 56.6 | 56.7 | 56.6 | 56.8 |
| L* | 92.3 | 92.1 | 91.8 | 92.2 | 92.1 | 92.3 | 92.1 | 92.1 | 92.1 | 92.1 |
| a* | −5.5 | −5.5 | −5.5 | −5.2 | −5.4 | −5.6 | −5.6 | −5.5 | −5.5 | −5.4 |
| b* | 0.9 | 0.8 | 1.1 | 0.9 | 0.8 | 0.7 | 1.0 | 0.8 | 0.9 | 0.9 |
| Dominant Wevelengt (nm) | 497.3 | 496.4 | 498.4 | 497.7 | 496.1 | 495.2 | 497.5 | 495.8 | 496.6 | 497.0 |
| % Purity | 2.0 | 2.0 | 1.9 | 1.8 | 2.0 | 2.2 | 2.0 | 2.1 | 2.0 | 1.9 |
|  | 11 | 12 | 13 | 14 | 15 | 16 | 17 | 18 | 19 | 20 |
| % Fe2O3 | 0.54 | 0.55 | 0.55 | 0.55 | 0.55 | 0.71 | 0.72 | 0.72 | 0.72 | 0.72 |
| % SO3 | 0.144 | 0.143 | 0.156 | 0.152 | 0.147 | 0.144 | 0.14 | 0.141 | 0.154 | 0.145 |
| % Ferrous | 25.6 | 25.9 | 25.8 | 26.3 | 26.2 | 26.0 | 26.5 | 25.8 | 25.4 | 25.6 |
| Thickness (mm) | 4 | 4 | 4 | 4 | 4 | 4 | 4 | 4 | 4 | 4 |
| % Tuv | 46.3 | 43.8 | 45.9 | 45.6 | 45.6 | 39.2 | 39.3 | 38.5 | 38.3 | 38.6 |
| % $T_{LA}$ | 79.0 | 79.1 | 79.4 | 79.4 | 78.9 | 75.4 | 74.6 | 74.9 | 75.6 | 75.0 |
| % Ts | 56.4 | 55.8 | 56.2 | 55.8 | 55.6 | 49.5 | 48.6 | 49.0 | 49.5 | 49.2 |
| L* | 91.9 | 91.9 | 92.0 | 92.0 | 91.8 | 90.4 | 90.0 | 90.1 | 90.4 | 90.1 |
| a* | −5.5 | −5.7 | −5.5 | −5.6 | −5.7 | −7.0 | −7.2 | −7.1 | −7.0 | −7.1 |
| b* | 1.0 | 1.2 | 0.9 | 1.1 | 0.9 | 1.3 | 1.2 | 1.5 | 1.8 | 1.5 |
| Dominant Wevelengt (nm) | 497.5 | 499.1 | 496.6 | 498.4 | 496.9 | 498.2 | 497.0 | 499.8 | 502.1 | 499.6 |
| % Purity | 2.0 | 1.9 | 2.0 | 1.9 | 2.1 | 2.4 | 2.6 | 2.3 | 2.2 | 2.4 |
|  | 21 | 22 | 23 | 24 | 25 | 26 | 27 | 28 | 29 | 30 |
| % Fe2O3 | 0.72 | 0.73 | 0.73 | 0.73 | 0.73 | 0.74 | 0.74 | 0.74 | 0.75 | 0.85 |
| % SO3 | 0.128 | 0.139 | 0.146 | 0.149 | 0.148 | 0.158 | 0.144 | 0.139 | 0.135 | 0.135 |
| % Ferrous | 26.3 | 26.4 | 25.9 | 25.9 | 25.7 | 24.8 | 25.2 | 26.2 | 25.0 |  |
| Thickness (mm) | 4 | 4 | 4 | 4 | 4 | 4 | 4 | 4 | 4 | 4 |
| % Tuv | 39.1 | 39.1 | 38.3 | 38.5 | 38.5 | 38.3 | 38.4 | 38.9 | 38.6 | 33.5 |
| % $T_{LA}$ | 75.3 | 75.2 | 75.1 | 75.1 | 75.0 | 75.5 | 75.9 | 75.0 | 75.1 | 71.9 |
| % Ts | 48.9 | 48.7 | 48.9 | 48.9 | 49.0 | 49.5 | 49.4 | 48.5 | 49.1 | 44.6 |
| L* | 90.3 | 90.3 | 90.2 | 90.2 | 90.2 | 90.3 | 90.6 | 90.2 | 90.2 | 88.8 |
| a* | −7.3 | −7.3 | −7.1 | −7.1 | −7.1 | −6.9 | −7.1 | −7.2 | −7.0 | −8.1 |
| b* | 1.6 | 1.2 | 1.5 | 1.5 | 1.5 | 1.6 | 1.7 | 1.3 | 1.4 | 1.9 |
| Dominant Wevelengt (nm) | 499.3 | 496.7 | 499.4 | 499.2 | 498.8 | 500.2 | 500.4 | 497.7 | 498.4 | 500.7 |
| % Purity | 2.5 | 2.7 | 2.4 | 2.4 | 2.4 | 2.8 | 2.3 | 2.6 | 2.4 | 2.7 |
|  | 31 | 32 | 33 | 34 | 35 | 36 | 37 | 38 | 39 | 40 |
| % Fe2O3 | 0.85 | 0.85 | 0.85 | 0.86 | 0.86 | 0.86 | 0.86 | 0.87 | 0.87 | 0.88 |
| % SO3 | 0.144 | 0.149 | 0.14 | 0.148 | 0.143 | 0.148 | 0.121 | 0.135 | 0.141 | 0.146 |
| % Ferrous | 25.9 | 25.8 | 26.4 | 26.9 | 25.9 | 25.4 | 26.5 | 26.0 | 26.2 | 25.5 |
| Thickness (mm) | 4 | 4 | 4 | 4 | 4 | 4 | 4 | 4 | 4 | 4 |
| % Tuv | 33.8 | 33.6 | 33.9 | 33.6 | 34.0 | 33.2 | 34.3 | 33.5 | 33.0 | 32.2 |
| % $T_{LA}$ | 71.9 | 71.9 | 71.9 | 71.3 | 71.7 | 71.5 | 72.5 | 71.5 | 71.7 | 71.4 |
| % Ts | 44.7 | 44.7 | 44.3 | 43.7 | 44.4 | 44.6 | 44.4 | 44.1 | 43.9 | 44.0 |
| L* | 88.8 | 88.8 | 88.8 | 88.6 | 88.7 | 88.5 | 89.1 | 88.6 | 88.7 | 88.5 |
| a* | −8.1 | −8.1 | −8.3 | −8.4 | −8.3 | −8.1 | −8.3 | −8.3 | −8.4 | −8.3 |
| b* | 1.9 | 2.2 | 1.9 | 1.7 | 1.9 | 2.3 | 1.7 | 1.8 | 2.0 | 2.5 |
| Dominant Wevelengt (nm) | 501.1 | 502.6 | 500.1 | 499.0 | 500.6 | 503.7 | 499.0 | 500.1 | 501.0 | 505.7 |
| % Purity | 2.6 | 2.6 | 2.8 | 2.9 | 2.7 | 2.5 | 2.9 | 2.8 | 2.8 | 2.5 |

TABLE 2

|  | 41 | 42 | 43 | 44 | 45 | 46 | 47 | 48 | 49 |
|---|---|---|---|---|---|---|---|---|---|
| % Fe2O3 | 0.98 | 0.98 | 0.98 | 0.98 | 0.98 | 0.98 | 0.98 | 0.98 | 0.96 |
| % Ferroso | 19.6 | 21.6 | 24.6 | 27.3 | 25.9 | 21.7 | 23.8 | 29.3 | 24.8 |
| % Carbon | 0.02 | 0.03 | 0.04 | 0.05 | 0.04 | 0.04 | 0.05 | 0.06 | 0.045 |
| % TiO2 | 0 | 0 | 0 | 0 | 0 | 0 | 0 | 0.1 | 0 |
| % CeO2 | 0 | 0 | 0 | 0 | 0 | 0.2 | 0.4 | 0.4 | 0.6 |
| Thickness (mm) | 3.5 | 3.5 | 3.5 | 3.5 | 3.5 | 3.5 | 3.5 | 3.5 | 3.5 |
| % Tuv | 30.10 | 31.80 | 28.80 | 31.00 | 33.00 | 33.40 | 29.40 | 28.20 | 27.60 |
| % $T_{LA}$ | 71.3 | 74.3 | 71.2 | 69.9 | 69.6 | 74.8 | 70.6 | 64.9 | 71.0 |
| % Ts | 48.3 | 48.2 | 44.0 | 42.7 | 43.6 | 48.2 | 45.1 | 39.3 | 45.0 |
| L* | 88.2 | 89.8 | 88.4 | 87.9 | 87.7 | 90.1 | 88.1 | 85.4 | 88.0 |
| a* | −6.8 | −7.5 | −8.6 | −8.9 | −8.1 | −7.5 | −7.7 | −8.8 | −8.3 |
| b* | 3.2 | 2.8 | 2.8 | 1.6 | 1.3 | 2.1 | 2.4 | 1.4 | 2.0 |
| Dominant Wevelengt (nm) | 523.2 | 512.4 | 507.9 | 497.8 | 497.1 | 503.9 | 506.8 | 496.7 | 502.3 |
| % Purity | 2.400 | 2.3 | 2.6 | 3.2 | 3.000 | 2.3 | 2.3 | 3.4 | 2.8 |

The examples 41 to 49 show the main impact on glass properties due to addition of cerium oxide in both ultraviolet radiation and ferrous ratios.

For industrial production is feasible to add CuO in minor concentrations to 120 ppm for a glass thickness of 4.0 mm and less than 100 ppm for a glass thickness of 6.0 mm.

TABLE 3

|  | 50 | 51 | 52 | 53 | 54 | 55 | 56 | 57 | 58 | 59 | 60 |
|---|---|---|---|---|---|---|---|---|---|---|---|
| % Fe2O3 | 0.74 | 0.74 | 0.74 | 0.74 | 0.81 | 0.81 | 0.81 | 0.81 | 0.81 | 0.87 | 0.87 |
| % TiO2 | 0.00 | 0.30 | 0.50 | 0.70 | 0.00 | 0.00 | 0.30 | 0.50 | 0.70 | 0.00 | 0.30 |
| % Ferroso | 24.0 | 24.4 | 24.5 | 25.1 | 23.5 | 24.0 | 24.1 | 23.7 | 25.8 | 26.0 | 26.3 |
| Thickness (mm) | 4 | 4 | 4 | 4 | 4.5 | 4 | 4 | 4 | 4 | 4 | 4 |
| % Tuv | 37.7 | 34.6 | 31.4 | 29.2 | 32.1 | 34.9 | 31.4 | 28.6 | 25.6 | 34.5 | 30.3 |
| % $T_{LA}$ | 74.3 | 73.6 | 72.9 | 72.3 | 71.2 | 73.0 | 72.4 | 71.8 | 70.1 | 70.4 | 69.5 |
| % Ts | 49.3 | 48.3 | 47.5 | 46.6 | 44.5 | 47.1 | 46.4 | 46.1 | 43.6 | 43.5 | 42.4 |
| L* | 89.8 | 89.4 | 88.9 | 88.6 | 88.4 | 89.2 | 88.8 | 88.4 | 87.6 | 88.2 | 87.6 |
| a* | −7.2 | −7.3 | −7.5 | −7.7 | −8.4 | −7.7 | −7.8 | −7.8 | −8.5 | −9.0 | −9.0 |
| b* | 1.7 | 3.1 | 4.5 | 5.8 | 2.3 | 1.9 | 3.7 | 5.3 | 6.1 | 0.7 | 3.0 |
| Dominant Wevelengt (nm) | 500.6 | 521.8 | 534.7 | 543.5 | 503.5 | 501.7 | 524.1 | 540.1 | 540.8 | 493.6 | 508.4 |
| % Purity | 2.32 | 2.76 | 3.48 | 4.73 | 2.63 | 2.48 | 2.88 | 4.26 | 4.89 | 3.86 | 2.72 |

|  | 61 | 62 | 63 | 64 | 65 | 66 | 67 |
|---|---|---|---|---|---|---|---|
| % Fe2O3 | 0.87 | 0.87 | 0.99 | 0.99 | 0.99 | 0.99 | 0.99 |
| % TiO2 | 0.50 | 0.70 | 0.00 | 0.00 | 0.30 | 0.50 | 0.70 |
| % Ferroso | 26.4 | 27.4 | 23.4 | 23.5 | 24.8 | 24.9 | 24.1 |
| Thickness (mm) | 4 | 4 | 3.5 | 4 | 4 | 4 | 4 |
| % Tuv | 29.4 | 25.3 | 32.0 | 29.1 | 25.1 | 22.7 | 20.8 |
| % $T_{LA}$ | 69.5 | 67.6 | 71.0 | 68.0 | 66.4 | 66.0 | 65.8 |
| % Ts | 42.2 | 40.2 | 45.5 | 41.7 | 39.5 | 38.8 | 38.9 |
| L* | 87.5 | 86.5 | 88.2 | 86.9 | 86.0 | 85.6 | 85.4 |
| a* | −9.0 | −9.5 | −7.5 | −8.8 | −9.5 | −9.6 | −9.4 |
| b* | 4.0 | 5.6 | 2.2 | 2.7 | 4.7 | 6.4 | 8.0 |
| Dominant Wevelengt (nm) | 522.3 | 533.4 | 504.5 | 505.8 | 525.7 | 538.4 | 549.0 |
| % Purity | 3.44 | 4.40 | 2.32 | 2.72 | 3.62 | 5.21 | 7.23 |

|  | 68 | 69 | 70 | 71 | 72 | 73 | 74 | 75 | 76 | 77 | 78 |
|---|---|---|---|---|---|---|---|---|---|---|---|
| Fe2O3 | 0.80 | 0.80 | 0.80 | 0.80 | 0.86 | 1.03 | 1.03 | 1.03 | 1.03 | 1.03 | 0.87 |
| TiO2 | 0.10 | 0.30 | 0.10 | 0.30 | 0.16 | 0.00 | 0.00 | 0.00 | 0.00 | 0.00 | 0.15 |
| Cr2O3 | 0.01 | 0.01 | 0.03 | 0.03 | 0.002 | 0.026 | 0.026 | 0.026 | 0.026 | 0.0 | 0.005 |
| % Ferrous | 26.3 | 25.8 | 23.7 | 24.9 | 26.0 | 21.9 | 18.4 | 23.0 | 27.0 | 33.0 | 25.0 |
| Thickness (mm) | 3.6 | 3.5 | 3.5 | 3.5 | 3.5 | 3.5 | 3.5 | 3.5 | 3.5 | 3.5 | 3.5 |
| % Tuv | 37.0 | 34.9 | 36.8 | 34.9 | 35.7 | 29.8 | 29.8 | 30.4 | 30.4 | 28.3 | 35.0 |
| % $T_{LA}$ | 71.6 | 72.5 | 69.7 | 69.1 | 72.9 | 66.8 | 68.5 | 66.6 | 64.7 | 60.4 | 73.4 |
| % Ts | 46.9 | 47.4 | 47.0 | 45.9 | 47.1 | 42.5 | 46.1 | 41.7 | 38.7 | 33.7 | 47.5 |
| L* | 88.5 | 88.8 | 87.7 | 87.2 | 89.2 | 86.1 | 86.8 | 86.1 | 85.3 | 83.3 | 89.4 |
| a* | −8.7 | −8.7 | −11.2 | −11.4 | −7.7 | −11.7 | −10.9 | −12.0 | −12.8 | −14.5 | −8.1 |
| b* | 3.7 | 4.9 | 8.0 | 8.9 | 2.3 | 8.4 | 8.9 | 7.9 | 7.0 | 6.4 | 3.6 |
| Dominant Wevelengt (nm) | 521.6 | 531.3 | 540.5 | 544.5 | 505.2 | 540.5 | 547.0 | 537.3 | 530.0 | 522.2 | 522.1 |
| % Purity | 3.3 | 3.7 | 6.4 | 7.5 | 2.3 | 6.9 | 7.8 | 6.3 | 5.5 | 5.9 | 3.1 |

|  | 79 | 80 | 81 | 82 | 83 | 84 | 85 | 86 | 87 | 88 | 89 |
|---|---|---|---|---|---|---|---|---|---|---|---|
| Fe2O3 | 0.87 | 0.87 | 0.87 | 0.85 | 0.87 | 0.85 | 0.87 | 0.86 | 0.88 | 0.86 | 0.88 |
| TiO2 | 0.15 | 0.15 | 0.15 | 0.10 | 0.10 | 0.15 | 0.15 | 0.10 | 0.10 | 0.15 | 0.15 |
| Cr2O3 | 0.005 | 0.005 | 0.005 | 0.01 | 0.01 | 0.015 | 0.015 | 0.01 | 0.01 | 0.005 | 0.005 |
| % Ferrous | 25.2 | 31.4 | 33.1 | 21.7 | 21.9 | 22.2 | 22.5 | 25.7 | 26.8 | 28.2 | 28.2 |
| Thickness (mm) | 3.5 | 3.5 | 3.5 | 3.5 | 3.5 | 3.6 | 3.5 | 3.5 | 3.5 | 3.5 | 3.5 |
| % Tuv | 34.3 | 34.4 | 35.4 | 34.4 | 34.7 | 33.8 | 34.0 | 35.1 | 34.1 | 33.2 | 34.3 |

TABLE 3-continued

| | | | | | | | | | | | |
|---|---|---|---|---|---|---|---|---|---|---|---|
| % $T_{LA}$ | 72.2 | 68.2 | 68.5 | 71.9 | 73.0 | 72.2 | 73.5 | 70.9 | 70.6 | 69.2 | 69.8 |
| % Ts | 46.7 | 41.3 | 40.8 | 49.1 | 49.0 | 48.8 | 49.0 | 45.7 | 44.6 | 43.5 | 43.5 |
| L* | 88.8 | 87.1 | 87.3 | 88.5 | 89.1 | 88.7 | 89.3 | 88.2 | 88.1 | 87.4 | 87.8 |
| a* | −8.1 | −9.4 | −9.8 | −8.1 | −8.3 | −7.4 | −7.6 | −9.0 | −9.4 | −9.1 | −8.9 |
| b* | 3.5 | 2.2 | 1.8 | 4.7 | 4.5 | 3.7 | 3.9 | 4.0 | 4.2 | 3.5 | 2.7 |
| Dominant Wevelengt (nm) | 521.9 | 500.6 | 497.9 | 533.3 | 530.2 | 525.5 | 527.2 | 522.6 | 522.5 | 514.1 | 505.5 |
| % Purity | 3.1 | 3.1 | 3.6 | 3.6 | 3.4 | 2.7 | 2.9 | 3.4 | 3.6 | 2.8 | 2.7 |

From the above, a dark green glass composition has been described and will apparent for the experts in the art that many other features or improvements can be made, which can be considered within the scope determined by the following claims:

What is claimed is:

1. A dark green colored glass comprising a base glass composition and a modifiying portion, in weight, consisting essentially of: from 0.71 to 1.50% of total iron expressed as $Fe_2O_3$; from 22 to 30% of $Fe^{2+}$ and from 0.15 to 0.50% of FeO, expressed as $Fe_2O_3$; from about 0.10 to about 0.20% of $SO_3$; from about 0 to about of 1.0% $TiO_2$; from about 0.0004 to about of 0.03% $Cr_2O_3$; and from about 0.0004 to about 0.015% CuO, wherein the glass composition having an illuminant "A" light transmission (TLA) greater than 65%, a total solar energy transmittance (TS) of less than or equal to 60%; a solar ultraviolet transmittance (TUV) of less than 46%; a dominant wavelength from 490 nm to 600, and an excitation purity of less than 7%.

2. The colored glass composition as claimed in claim 1, wherein less than 0.8% of cerium oxide is present for improving the UV absorption.

3. The colored glass composition of claim 1 wherein the glass composition having an illuminant "A" light transmission (TLA) greater of 65%, a total solar energy transmittance (TS) of less than or equal to 60%; a solar ultraviolet transmittance (TUV) of less than 46%; a dominant wavelength from 490 nm to 600; and an excitation purity of less than 7, wherein said glass is produced with a for thickness of 3.5 mm.

4. The colored glass composition of claim 1, wherein said glass is produced with a thickness from about 1.6 mm to about 12 mm.

5. The colored glass composition of claim 1, wherein said glass is produced with a thickness from about 1.6 mm up to 5 mm.

6. The colored glass composition of claim 1, wherein the CuO is less than 120 ppm for a glass thickness greater than 4.0 mm.

7. The colored glass composition of claim 1, wherein the CuO is less than 100 ppm for a glass thickness greater than 6.0 mm.

* * * * *